US006204355B1

(12) United States Patent
Dalla Torre et al.

(10) Patent No.: US 6,204,355 B1
(45) Date of Patent: Mar. 20, 2001

(54) USE OF POLYAMIDE MOULDING COMPOUNDS FOR MANUFACTURING OPTICAL OR ELECTRO-OPTICAL MOULDED MEMBERS

(75) Inventors: Hans Dalla Torre, Domat/Ems (CH); Ralf Hala, Lindenberg (DE)

(73) Assignee: EMS-Inventa AG (CH)

( * ) Notice: Subject to any disclaimer, the term of this patent is extended or adjusted under 35 U.S.C. 154(b) by 0 days.

(21) Appl. No.: 09/425,483

(22) Filed: Oct. 22, 1999

Related U.S. Application Data

(63) Continuation of application No. 08/953,479, filed on Oct. 17, 1997, now abandoned.

(30) Foreign Application Priority Data

Oct. 17, 1996 (DE) ............................................. 196 42 885

(51) Int. Cl.[7] .......................... C08G 69/26; C08G 69/28; G02B 3/00; G02B 25/00; B29D 11/00
(52) U.S. Cl. ......................... 528/310; 528/322; 528/324; 528/329.1; 528/332; 528/338; 528/339; 528/340; 528/346; 528/347; 528/349; 525/432; 359/642; 351/41; 264/1.1; 264/1.32
(58) Field of Search ................................ 528/310, 322, 528/324, 346, 347, 349, 329.1, 339, 338, 340, 332; 525/432; 264/1.1, 1.32; 351/41; 359/642

(56) References Cited

U.S. PATENT DOCUMENTS

| 4,232,145 | * | 11/1980 | Schmid et al. | 528/310 |
| 4,345,066 | * | 8/1982 | Rüter | 528/310 |
| 4,731,421 | * | 3/1988 | Hoppe et al. | 528/310 |
| 4,898,896 | * | 2/1990 | Maj et al. | 528/310 |
| 5,612,446 | * | 3/1997 | Presenz et al. | 528/310 |
| 5,684,120 | * | 11/1997 | Torre | 528/310 |
| 5,688,901 | * | 11/1997 | Fisch et al. | 528/310 |
| 5,773,558 | * | 6/1998 | Torre | 528/335 |
| 5,917,004 | * | 6/1999 | Liedloff | 528/332 |
| 6,008,288 | * | 12/1999 | Dalla Torre | 524/538 |

FOREIGN PATENT DOCUMENTS 0 603 813  6/1994  (EP) .

* cited by examiner

*Primary Examiner*—P. Hampton-Hightower
(74) *Attorney, Agent, or Firm*—Marshall & Melhorn

(57) ABSTRACT

The invention relates to the use of polyamide moulding compounds, their alloys or blends, which contain at least one homopolyamide, which has been obtained from long-chained aliphatic monomer blocks with cycloaliphatic monomer blocks, in order to manufacture moulded members for optical or electro-optical applications.

22 Claims, No Drawings

USE OF POLYAMIDE MOULDING COMPOUNDS FOR MANUFACTURING OPTICAL OR ELECTRO-OPTICAL MOULDED MEMBERS

CROSS REFERENCE TO RELATED APPLICATION

This application claims continuing status under 35 U.S.C. §120, of U.S. patent application Ser. No. 08/953,479, filed on Oct. 17, 1997, which application was pending as of the filing date of this application. U.S. application Ser. No. 08/953,479 has since been abandoned.

BACKGROUND OF THE INVENTION

The invention relates to the use of polyamide moulding compounds, whose alloys or blends, which have at least one homopolyamide, for optical or electro-optical purposes.

Transparent plastics are used in an increasing number of applications as a replacement for mineral glass etc., but also as a replacement for further materials. The reasons for this are the considerable economy in weight, simplicity of cleaning, simple re-use, much improved recycling, more versatile, more rapid and more risk-free applicability, the many possibilities of providing special properties, the fashionable effect, economic disposal and increasingly competitive prices.

In addition to the transparent plastics such as PMMA, PS, ABS, PVC, cellulose butyrate, cellulose acetate, CR 39 which in part have been known for some time, there have become known further materials such as PC, SAN, SB, CAP, PET, PBT, PSU, PVF, PU, APEC, COC and amorphous polyolefines. In addition to these, transparent polyamides have also become established and are to be encountered as operational parts in the automobile and electrical industries, in precision technology, medical technology and in the fashion industry.

In addition to PC, PMMA, among others, transparent polyamides are favoured materials for spectacle frames and spectacle lenses; they have however not been used in the actual optical field as lenses, magnifying glasses, sunglasses, etc. due to the lack of transparency, purity, toughness, resistance to solvents, scratch resistance (scratch hardness) and dimensional stability. A disadvantage in these previously known transparent polyamides is above all that they do not simultaneously have a low density, a high refractive index and a high Abbé coefficient. These parameters however are extremely important particularly for optical applications of polyamides, as for example lenses should have not only a high refractive index and a high Abbé coefficient, but simultaneously also a relatively low density. only in this way is it possible to manufacture functional lenses, which also have the corresponding softness. In addition to these requirements, however, it is necessary for most optical and electro-optical applications that the materials in question here should be heat-resistant, solvent-resistant and scratch-resistant. In these applications there is also a requirement for the materials to have a high degree of alternate-bending fatigue strength and a high degree of toughness. Proceeding from this point it is the object of the present invention to propose polyamides which can be used for optical applications, in which on the one hand there is a high refractive index and a high Abbé coefficient and simultaneously a relatively low density. These polyamides are in addition intended to have a high degree of alternate-bending fatigue strength, resistance to chemicals and resistance to heat deformation.

SUMMARY OF THE INVENTION

This object is achieved by the characterising features of claim 1. The secondary claims indicate advantageous further developments.

DETAILED DESCRIPTION OF THE PREFERRED EMBODIMENT

The Applicant was surprisingly able to discover that the transparent polyamides known per se from EP 0 725 101 A1 fulfil all the set requirements. The transparent polyamides according to EP 0 725 101 A1 are therefore used according to the invention for manufacturing moulded members for optical or electro-optical applications. The transparent polyamides are particularly suitable for lenses, spectacle lenses or magnifying lenses and for optical fibres or cable protective tubes for optical waveguides. It has become apparent that the transparent polyamides may also be used to manufacture colourless or coloured optical semi-products or spectacle lenses or lenses or spectacle frames and combinations thereof.

The polyamide is also used in the manufacture of protective masks, visors, as inspection and cover portions in instruments such as watches, mirror and illuminating glasses in filter cups, as protective and viewing windows in vehicles, in sport and leisure equipment, as operational parts in the field of medicine, telecommunications, toiletries, household, automobiles and transport.

The optical and electro-optical moulded bodies manufactured from the transparent polyamides are particularly characterised by an excellent surface quality, by a glass-clear brilliant and distortion-free transparency with a light transmission of over 90% for layer thicknesses $\geq 5$ mm, by alternative-bending fatigue strengths on test bodies according to DIN 53442 of more than 2 million cycles, by a high notched impact value of more than 12 KJ/m$^2$, by a low density of $\leq 1.1$ g/cm$^3$, by a high refractive index $n_D^{20}$ of 1.50, by a resistance to heat deformation corresponding to a glass point of 157° C., an outstanding resistance to chemicals and solvents (such as alcohols, ketones, esters, aromatic and halogenised KW), an excellent scratch strength (Clemens) and a low water absorption of <1.5%.

The moulded members in addition have a good resistance to weathering, whether in relation to their surface, transparency, brilliance or with relation to mechanical properties such as tensile impact strength and elongation at break; they are easy to coat, easy to colour, and resistant to scratching and wear. The moulded bodies may be simply processed at average temperatures of 250° C. to 280° C. by means of injection moulding, injection-blow moulding, deep drawing, extrusion and similar processing to produce moulded and hollow articles.

The optical or electro-optical moulded articles produced from the transparent polyamides are thus characterised by excellent transparency and a good surface, by a low specific weight, a high degree of toughness and alternate-bending fatigue strength, outstanding resistance to solvents and heat, in conjunction with outstanding wearing hardness, scratch resistance, rigidity and dimensional stability, good facility for coating and good optical characteristics ($n_D^{20}$ Abbé coefficient).

Even with knowledge of the previously-known EP 0 725 101 A1 it was not to be expected by the person skilled in the art that these polyamides would have all these required properties in combination, the more so in that the most varied types of plastics had been used previously for optical applications, particularly lenses and spectacle lenses, yet not an amorphous polyamide. It is therefore surprising that just this selected class of polyamides fulfils all these properties in combination.

As regards materials, the invention relates to the use of all the polyamides described in EP 0 725 101 A1. Express reference is therefore made to the disclosed content of this document.

Those homopolyamides however in which Bis(amino)-cycloalkanes, particularly Bis(3-methyl-4-aminocyclohexyl)-methanes are used as a cycloaliphatic diamine. It is also possible for the latter cycloalkane to be replaced by 50% of other Bis(amino) cycloalkanes. In a particularly preferred form however, a transparent polyamide is used in which the above described cycloaliphatic diamines are used, i.e. in combination with aliphatic dicarboxylic acids with 8 to 12 C-atoms. Dodecanedioic acid is particularly preferred. The dodecanedioic acid can be replaced up to 50% by aromatic acids. It has also proved advantageous to replace the dodecanedioic acid partly or entirely by sebacic acid or azelaic acid or another aliphatic dicarboxylic acid of more than 12 C-atoms.

The dodecanedioic acid may also be replaced by up to 50 mol-% aromatic dicarboxylic acids like isophtalic acid, teraphtalic acid or mixtures thereof.

By means in particular of the combinations of raw materials mentioned above to manufacture the transparent polyamides, their optical properties can be further optimized. By means of Bis(3-methyl-4-aminocyclohexyl)-methanes and dodecanedioic acid, for example optical lenses can be manufactured which have a density of $\leq 1.1$ g/cm$^3$, a refractive coefficient $n_D^{20} \leq 1.50$ and an Abbé coefficient of >40.

Naturally it is also possible, as already described in EP 0 725 101 A1, for transparent alloys or blends of the polyamide molding compounds described above to be used. In the alloys, PA 12 or PA 11 is preferably used as an alloy component. In the case of blends, further amorphous polyamides can be used. The polyamide molding compounds can contain all the conventionally known additives such as heat stabilizers, UV-stabilizers, additives, fillers, fibers, pigments, impact resistance modifiers of all types, and plasticizers.

The invention will be described in more detail in the following with reference to two embodiments.

EXAMPLE 1

Manufacture of Lenses by Injection Moulding

The dried transparent granulate of the homopolyamide of Bis(3-methyl-4-aminocyclohexyl)-methane and dodecanedioic acid with a solution viscosity in 0.5% m-Kresol of 1.71 and a moisture content of 0.06% H$_2$O was passed through a hopper misted with nitrogen to an injection moulding machine of the type Arburg 320-210-75 and injected after a flushing time of 15 minutes to produce spectacle lenses of 1.5 mm thickness and 65 mm diameter. The cylinder temperatures were 265, 270, 275, 280° C., the mass temperature 275° C., the injection pressure and dwell pressure 50 bar, and the cycle time was 19 seconds. The tool had twelve half-shell cavities disposed in a star configuration about a central sprue tunnel; the tool temperature was 80° C. The lenses obtained were fully transparent and extremely clean and were tested with good results by means of test methods usual for optical purposes.

Individual lenses were dip-coated and dried, others provided with a mirror finish in a vacuum evaporation installation. Both types of coating resulted in uniform and good adhesion to the polyamide lens. Likewise, the wear test was satisfactory. Samples of the lenses were used in a prepared spectacle frame of the same polyamide material. The entire spectacle unit had a weight of 34 g. The lenses had a density of 1.01 g/cm$^3$, a refractive index of 1.510 and an Abbé coefficient of 52.

EXAMPLE 2

Manufacture of Covering Tubes for Optical Waveguides

A Nokia extrusion machine SLC 24 was fed with the same polyamide granulate as in Example 1. At 240 to 280° C. a hollow core of 3 mm with a wall thickness of 0.5 mm was extruded with an optical fibre of Dow Corning embedded in jelly with a take off speed of 100 m/min. cooled and rolled up by means of two water baths and one air bath. On 100 m of a loose buffered cable system the attenuation was measured in the temperature range −30° C. to +80° C.; the increase in attenuation was extremely low due to the high dimensional stability of the loose jacketing polyamide material.

What is claimed is:

1. A method for manufacturing a transparent optical molded body, with a polyamide molding compound or the compound's alloys or the compound's blends, wherein the compound, the compound's alloys or the compound's blends contains at least one 100% homopolyamide which has been derived from alkyl-substituted cycloaliphatic diamines with 14 to 22 C-atoms without ester or ether groups and unbranched aliphatic dicarboxylic acids with 8 to 14 C-atoms, comprising the step of making the polyamide molding compound.

2. The method according to claim 1, wherein the unbranched aliphatic dicarboxylic acids are replaced by a maximum of 50 mol-% aromatic dicarboxylic acids.

3. The method according to claim 1, wherein the cycloaliphatic diamines are Bis-(amino)-cycloalkane compounds.

4. The method according to claim 2, wherein the cycloaliphatic diamines are Bis-(amino)-cycloalkane compounds.

5. The method according to claim 3, wherein the Bis (amino)-cycloalkane compound is Bis-(3-methyl-4-aminocyclohexyl)-methane.

6. The method according to claim 4, wherein the Bis (amino)-cycloalkane compound is Bis-(3-methyl-4-aminocyclohexyl)-methane.

7. The method according to claim 5, wherein the Bis(3-methyl-4-aminocyclohexyl)-methane is replaced by up to 50 mol-% of other Bis-(amino)-cycloalkane compounds.

8. The method according to claim 6, wherein the Bis(3-methyl-4-aminocyclohexyl)-methane is replaced by up to 50 mol-% of other Bis-(amino)-cycloalkane compounds.

9. The method according to claim 1, wherein the aliphatic dicarboxylic acids have 8 to 12 C-atoms.

10. The method according to claim 9, wherein the aliphatic dicarboxylic acid is dodecanedioic acid.

11. The method according to claim 10, wherein the dodecanedioic acid is replaced by up to 50 mol-% of aromatic acids.

12. The method according to claim 10, wherein the dodecanedioic acid is partly or entirely replaced by an acid selected from the group consisting of sebacic acid, azelaic acid and an aliphatic dicarboxylic acid with more than 12 C-atoms.

13. The method according to claim 1, wherein the optical molded body is an optical lens with a density of $\leq 1.1$ g/cm$^3$, a refractive coefficient $n_D^{20} \geq 1.50$, and an Abbé coefficient of >40.

14. The method according to claim 1, wherein the optical molded body is selected from the group consisting of lenses, spectacle lenses, magnifying glasses, and spectacle frames.

15. The method according to claim 1, wherein the optical molded body is colored.

16. The method according to claim 1, wherein the optical molded body is colorless.

17. The method according to claim 1, wherein the optical molded body is an optical fiber or a cable protective tube for optical waveguides.

18. The method according to claim 1, wherein the optical molded body is an optical semiproduct.

19. The method according to claim 1, wherein the optical molded body is an electro-optical component.

20. The method according to claim 11, wherein the aromatic acids are aromatic dicarboxylic acids.

21. The method according to claim 20, wherein the aromatic dicarboxylic acids are selected from the group consisting of isophthalic acid, terephthalic acid and mixtures of isophthalic acid and terephthalic acid.

22. An optical lens, comprising a polyamide molding compound or the compound's alloys or the compound's blends, the compound, the compound's alloys or the compound's blends containing at least one homopolyamide which has been derived from long-chain aliphatic monomer blocks with cycloaliphatic monomer blocks and the lens having a density of $\leq 1.1$ g/cm$^3$, a refractive coefficient $n_D^{20} \geq 1.50$, and an Abbé coefficient of >40.

* * * * *